United States Patent
Teran et al.

(10) Patent No.: US 7,247,334 B2
(45) Date of Patent: *Jul. 24, 2007

(54) LOW-RESIDUE, EASY-CLEANING AND LOW-VISCOSITY STRUCTURED LIPID PAN RELEASE COMPOSITIONS AND METHODS

(75) Inventors: Pamela Lynn Teran, Bourbonnais, IL (US); Dilip K. Nakhasi, Bourbonnais, IL (US); Howard W. Shuman, Flossmoor, IL (US); Roger L. Daniels, Manhattan, IL (US)

(73) Assignee: Bunge Oils, Inc., Bradley, IL (US)

( * ) Notice: Subject to any disclaimer, the term of this patent is extended or adjusted under 35 U.S.C. 154(b) by 225 days.

This patent is subject to a terminal disclaimer.

(21) Appl. No.: 10/706,633

(22) Filed: Nov. 12, 2003

(65) Prior Publication Data

US 2004/0115332 A1      Jun. 17, 2004

Related U.S. Application Data

(63) Continuation-in-part of application No. 10/100,449, filed on Mar. 18, 2002, now Pat. No. 6,793,959.

(51) Int. Cl.
*A23D 9/00* (2006.01)

(52) U.S. Cl. .................................. 426/606; 426/811

(58) Field of Classification Search .................. None
See application file for complete search history.

(56) References Cited

U.S. PATENT DOCUMENTS

| | | | |
|---|---|---|---|
| 4,188,412 A | 2/1980 | Sejpal | |
| 4,425,164 A | 1/1984 | Bliznak et al. | |
| 4,605,563 A * | 8/1986 | Heine et al. | 426/607 |
| 4,654,220 A * | 3/1987 | Heine et al. | 426/609 |
| 4,832,975 A * | 5/1989 | Yang | 426/607 |
| 4,863,753 A | 9/1989 | Hunter et al. | |
| 4,871,768 A | 10/1989 | Bistrian et al. | |
| 5,156,876 A | 10/1992 | Clapp et al. | |
| 5,288,512 A * | 2/1994 | Seiden | 426/607 |
| 5,374,434 A | 12/1994 | Clapp et al. | |
| 5,380,544 A | 1/1995 | Klemann et al. | |
| 5,391,383 A | 2/1995 | Sullivan et al. | |
| 5,431,719 A | 7/1995 | Clapp et al. | |
| 5,468,507 A * | 11/1995 | Czap | 426/99 |
| 5,567,456 A | 10/1996 | Clapp et al. | |
| 5,589,217 A | 12/1996 | Mazurek | |
| 5,660,865 A | 8/1997 | Pedersen et al. | |
| 6,123,977 A * | 9/2000 | Diamond | 426/601 |
| 6,124,486 A | 9/2000 | Cherwin et al. | |
| 6,160,007 A | 12/2000 | DeMichele et al. | |
| 6,194,379 B1 | 2/2001 | McEwen et al. | |
| 6,238,926 B1 | 5/2001 | Liu et al. | |
| 6,403,144 B1 | 6/2002 | El-Khoury et al. | |
| 6,544,574 B2 | 4/2003 | El-Khoury et al. | |
| 6,793,959 B2 * | 9/2004 | Nakhasi et al. | 426/609 |
| 2002/0001660 A1 | 1/2002 | Takeuchi et al. | |
| 2003/0175404 A1 | 9/2003 | Nakhasi | |

OTHER PUBLICATIONS

21CFR 166.110. 1982. p. 401.*
Gellar, D. 2000. Rheology of Vegetable Oil Analogs and Triglycerides. JAOCS 77(2)111.*
Ghosh, M. et al. 1999. Enzymatic interesterification of blends of castor oil and some oils rich in satmruated fatty acids. Fett/Lipid 101,Nt. 6. 214-216.*
Noursddini, H. et al. 1992. Viscosities of Vegetable oOils and Fatty Acids. JAOCS 69(12)1189.*
Dull, N et al. 1989. Inter-relationships Among the Properties of Fatty Oils. JAOCS 66(5)701.*
PCT/US2004/037167 International Search Report, dated Apr. 15, 2005.
Karl F. Mattil et al., "Bailey's Industrial Oil and Fat Products", Interscience Publishers—Third Edition, 1964, pp. 55-56, New York, London, Sydney.
Harry Lawson, "Food Oils and Fats", Technology, Utilization, and Nutrition, Chapman & Hall, 1995.
John M. deMan, PhD., "Principles of Food Chemistry", Third Edition, A Chapman & Hall Food Science Book, Aspen Publication, Gaithersburg, Maryland, 1999.

* cited by examiner

*Primary Examiner*—Carolyn Paden
(74) *Attorney, Agent, or Firm*—Cook, Alex, Mc Farron, Manzo, Cummings & Mehler Ltd.

(57) ABSTRACT

Medium chain triglyceride oils are interesterified with long chain edible oils in order to form interesterified structured lipids. These structured lipids find special application in food service pan release cooking compositions and methods. The products have a relatively low viscosity of between about 20 and about 52 centipoise while having a smoke point which is especially suitable for cooking applications. They provide enhanced release properties, reduced darkening effects, less residue build-up, and enhanced cleaning of griddling, cooking and baking pans, containers and utensils.

34 Claims, No Drawings

LOW-RESIDUE, EASY-CLEANING AND LOW-VISCOSITY STRUCTURED LIPID PAN RELEASE COMPOSITIONS AND METHODS

CROSS-REFERENCE TO RELATED APPLICATION

This is a continuation-in-part of application Ser. No. 10/100,449, filed Mar. 18, 2002 U.S. Pat. No. 6,793,959, the subject matter thereof being incorporated hereinto.

BACKGROUND OF THE INVENTION

1. Field of the Invention

This invention generally relates to pan release compositions having low viscosity and good functional properties including one or more of less residue build-up, reduced darkening, and enhanced cleaning ease. More particularly, the invention relates to pan release compositions having low viscosity structured lipids as pan release components and which compositions are applied by spraying onto a cooking surface, have a smoke point which is suitable for cooking applications, and as combined with other components of the pan release composition reduce residue build-up and/or exhibit the other good functional properties noted herein. These compositions are especially valuable for food service uses, where large-batch food preparation is typical and where clean-up issues are more formidable than for uses on a smaller scale.

2. Description of Related Art

Vegetable-based edible oil compositions long have been used in cooking applications. Edible oil products provide taste, nutrition and anti-stick properties for any number of pan cooking, baking or similar types of uses and applications. Edible oil products of this general type include margarines, whipped spreads, tub margarines, shortenings, oils and sprayable compositions. Room temperature viscosities of these products vary depending upon the composition and the intended end use. Some such end uses require a viscosity low enough to permit propelling of the composition by an aerosol unit, a pump assembly, or other means for dispensing in a spray or mist pattern, whether for use in home kitchens, commercial kitchens, or on industrial cooking or baking lines. Products which are dispensable in these manners are referred to herein as pan release products or pan release compositions.

In the pan release art, references such as Rubin et al. U.S. Pat. No. 3,661,605 teach a surface release product in the form of an aerosol composition which is dispensed onto a cooking surface intended to be heated for food cooking purposes. This so-called pan release composition contains lecithin in a water dispersion, together with an aerosol propellant and a preservative which can be a vegetable oil and a fatty acid ester in relatively low quantities. When a typical product of this type is sprayed onto a cooking surface, the objective is to have a non-stick film of hydroxylated lecithin formed on the cooking surface. While products of this type have proven to be successful, improvements have been sought in these types of products, and this invention provides means for improving pan release products.

Clapp et al. U.S. Pat. No. 5,156,876, U.S. Pat. No. 5,374,434, U.S. Pat. No. 5,431,719 and U.S. Pat. No. 5,567,456 disclose food release compositions which generally require a water-in-oil emulsion including lecithin, an edible oil and an emulsifying agent. Avoiding the use of an alcohol such as grain alcohol is noted in some Clapp et al. art as being desirable. Incorporating phosphated glycerides also is noted. Standard edible oil components are taught by the Clapp et al. art.

The present invention provides a pan release composition having a novel type of pan release component or product which incorporates interesterification technology to provide pan release products that have multiple advantageous properties which are desired for pan release applications. These include a smoke point which is adequate to perform properly in various types of cooking applications. It is often difficult to obtain an adequately high smoke point in a product which must be thin enough to be sprayable. It is also important that pan release products which exhibit a lightness in color when used under heat application and which minimize residue build-up so as to not detract from the appetizing appearance of the food or the like being cooked or baked with the pan release product.

Medium chain triglyceride (MCT) edible oils are known in the art including Seiden U.S. Pat. No. 5,288,512, Bertoli et al. U.S. Pat. No. 5,395,629, Hidaka U.S. Pat. No. 5,503,855 Takeuchi U.S. Patent Publication No. 2002/0001660, and Heydinger and Nakhasi, "Medium Chain Triacylglycerols, *Journal of Food Lipids*, 3, pages 251-257 (1996). These, and each of the publications and patents noted throughout herein, are incorporated by reference hereinto.

Publications such as these define these medium chain triglyceride or medium chain triacylglycerol (MCT) compounds as being a class of lipids of glycerol ester fatty acids. MCT's are esters of glycerol with medium chain fatty acids of 6 to 12 carbon chain lengths. Sources of these fatty acids typically are lauric oils. Coconut and palm kernel oils contain significant quantities of C8 (caprylic) and C10 (capric) chains. Often, isolated fractions of C8 and C10 acids contain small amounts of C6 and C12 acids as well. The primary components of MCT edible oils have C8:0 and C10:0 fatty acid chains.

Interesterification is a known reaction of triacylglycerol structures whereby individual positions of interesterified fatty acids are interchanged on the glycerol moiety. This is at times referred to or recognized as a randomization wherein fatty acid moieties from one glycerol component are exchanged with those of another glycerol component. The result is to prepare glycerol moieties which have interchanged fatty acid moieties which vary from glycerol structure to glycerol structure. Art in this area includes Pelloso et al. U.S. Pat. No. 5,434,278, Doucet U.S. Pat. No. 5,908,655, Cherwin et al. U.S. Pat. No. 6,124,486 and Liu et al. U.S. Pat. No. 6,238,926.

The art of interesterification has developed to provide, for example, triglyceride compositions which provide certain melt profiles which can be of interest in certain applications. Generally these are recognized as "structured lipids" in order to help distinguish the interesterified products from physical blends of the same components which have not been subjected to interesterification.

Heretofore, it has not been appreciated that the combination of interesterification technology and MCT technology would be especially advantageously applied to the task of improving pan release compositions. An especially important problem in this regard, which is addressed by interesterified components according to the invention, is to provide a composition that has a water-like viscosity to enable even aerosol spraying while simultaneously having improved darkening control, as well as a smoke point high enough to provide excellent pan cooking or baking characteristics.

SUMMARY OF THE INVENTION

In accordance with the present invention, products are provided which have advantageously low viscosities, high, smoke points, and low residue build-up in order to satisfy in an exceptional manner the needs of pan release cooking products. These products have as a principal component a structured lipid which is a product of the interesterification of an edible long chain triglycerides and a medium chain triglycerides. These structured lipids can be formulated into pan release compositions in conjunction with components such as propellants, lecithin, phosphated glycerides, and other suitable components in this regard. The structured lipids themselves have a relatively low viscosity of between about 20 at about 52 centipoise, together with a smoke point of between at least about 195° C. and about 221° C. (at least about 383° F. and about 430° F.).

A general object of the present invention is to provide pan release compositions which have low viscosity structured lipids that exhibit a viscosity suitable for dispensing in a spray pattern and which have a smoke point suitable for cooking.

An aspect or object of the present invention is that it provides compositions of edible oil having medium chain fatty acids and long chain fatty acids on the same glycerol backbone, which has been found to reduce viscosity and enhance smoke points when compared with physical blends of the same MCT and longer chain components.

Another aspect of this invention is that it incorporates structured lipids displaying a solids fat content which is substantially liquid at 10° C., which solids fat content is very appropriate for pan release cooking uses.

Another aspect of the present invention is providing food service pan release compositions having an edible oil component made by an interesterification process for accomplishing randomized interesterification of medium chain edible oils with long chain edible oils.

Another aspect is to provide pan release products which achieve easier clean-up and reduce residue build-up and darkening when compared with currently used pan release compositions, especially when used for larger-scale food preparation needs of the commercial food service industry.

Other aspects, objects and advantages of the present invention will be understood from the following description according to the preferred embodiments of the present invention. Included are combinations of various features hereof which are combined in various manners.

DESCRIPTION OF THE PREFERRED EMBODIMENTS

The present invention is directed toward compositions having structured lipids produced from medium chain triglycerides. These compositions have properties which are particularly suitable for the food service industry. These structure lipids have been found to be especially valuable in such compositions.

Medium chain triglycerides usually are produced commercially by splitting and distilling fatty acids from coconut or palm kernel oils. Production includes esterification with glycerin to form a triglyceride having fatty acid chain lengths of from C6 to C12. These known edible oils typically contain 50 to 80 weight percent of C8 caprylic fatty acids and between about 20 and about 50 weight percent of C10 capric fatty acids. Minor levels, typically between about 1 and about 2 weight percent, of either or both of C6 caproic fatty acids and C12 lauric fatty acids can be present in some such products.

Known MCT products include some NEOBEE® products such as NEOBEE® M-5 (trademark and product of Stepan Company), CAPTEX® 300 (trademark and product of Abitec Corp.), and MIGLYOL® 812 (trademark and product of Clionova, Inc.). Traul et al., "Review Of The Toxicologic Properties Of Medium-Chain Triglyceride", *Food and Chemical Toxicology*, 38, pages 79-98 (2000) indicate that MCTs are essentially non-toxic in acute toxicity tests conducted in several species of animals. This article also indicates that MCTs exhibit virtually no ocular or dermal irritant potential, even with prolonged eye or skin exposure. This article also indicates that MCTs exhibit no capacity for hypersensitivity induction. According to this publication, the safety of MCTs in human dietary consumption has been indicated up to levels of 1 g/kg.

Another publication indicates that MCTs result in lower fat deposition when compared with long chain triglycerides. This is noted in Ingale et al., "Dietary Energy Value of Medium-Chain Triglycerides", *Journal of Food Science*, Volume 64, No. 6, pages 960-963 (1999). Conclusions reached in this article state that differences in energy utilization show that increments of heat associated with the metabolism of MCTs appears to be about 16 percent higher as compared to long chain triglycerides. With this in mind, the calculated mean net caloric energy value for MCTs used in diets is on the order or 6.8 kcal/g. This is lower than typical LCTs. According to the publication, substituting MCTs for LCTs as the source of fat in diets show reduced weight gain and reduced fat deposition in laboratory animals and humans. This is said to be due to the lower gross energy density of an efficient utilization of energy from MCTs.

From this information, medium chain triglycerides are indicated as having dietary advantages at least from the point of view of fat deposition. Medium chain triglycerides also are indicated by art such as this as being suitable for use in the context of human food applications. MCTs however have relatively low smoke points, making them less than satisfactory for pan release uses.

Interesterification of these MCTs according to the invention includes charging them to an interesterification location or vessel as part of the charge for forming the structured lipid. Typically, MCTs comprise between about 25 and about 75 weight percent of the structured lipid charge. Generally, the charged quantities of interesterification reactants correspond closely to the respective weight percents in the interesterified structured lipid. Preferably, the quantity of MCTs is between about 30 at about 60 weight percent, most preferably between about 35 and about 55 weight percent.

Also part of the charge for forming the structured lipids are edible oils. Edible oils for the interesterification according to the invention include long chain tryglycerides, soybean oil, corn oil, cottonseed oil, canola oil, safflower oil, sunflower oil, peanut oil, olive oil, palm oil, coconut oil, oil from grain plants, and identity preserved oils such as identity preserved canola oil and the like. Whichever edible oil is chosen, it will be a liquid oil. Hydrogenation typically need not be carried out. Oils of these types are well recognized as so-called long chain lipids. Chain lengths of these oils generally lie between C16 and C22, as will be generally appreciated in the art.

The charge of such edible oil to the interesterification location or vessel comprises between about 75 and about 25 weight percent of the charge, and substantially the same level of long chain component is in the interesterified structured lipid. Preferably, this amount is between about 70 and about 40 weight percent, most preferably between about 65 and about 45 weight percent, based upon the weight of the charge or interesterified structured lipid.

With further reference to the edible oils having chain lengths longer than the MCT reactant, advantageously they are preferably substantially unsaturated oils such as soybean, corn, cottonseed and canola, which are well known in the art as liquid oil commodities. Certain specialty oils also are encompassed within the preferred domestic oils. These include identity preserved canola oils and refined, bleached and deodorized high stable oils. Included is naturally high stable canola oil such as NATREON oil (trademark, available from Dow Agro Sciences, Canbra Foods), which is naturally higher in monounsaturated fats and in oleic fatty acid and lower in linolenic fatty acid. In this regard, Sornyk et al U.S. Pat. No. 5,965,755 and Lanuza et al. U.S. Pat. No. 6,169,190 are noted.

The chemical interesterification used in making the structured lipids of the invention involves charging the reactants into an interesterification reactor vessel. Such vessels have means for heating the reactants during agitation and under reduced pressure or vacuum conditions. The reaction is carried out in the presence of a suitable interesterification catalyst and typically proceeds rapidly to completion or substantial completion. Typically, the interesterification is a reaction to or toward complete randomization, which would equate to a degree of interesterification of 100 percent of the fatty acyl chains.

Interesterification catalysts include metal alkoxides, alkali metals, alkali metal alloys, and metal hydroxides. Alkoxides include alkali metal alkoxides, such as sodium methoxide, sodium ethoxide, potassium methoxide and potassium ethoxide. Alkali metals include sodium. Alkali metal alloys include sodium/potassium alloy, and metal hydroxides include alkali metal hydroxides such as sodium hydroxide and potassium hydroxide.

Once the interesterification has proceeded to form the desired structured lipid, steps can be taken to modify the conditions away from reaction conditions. This can include inactivating the catalyst, reducing the temperature, reducing the vacuum applied, ceasing agitation, or any combination of these changes. Means for accomplishing these changes will be appreciated by those skilled in the art.

Reaction temperatures range between about 80° C. and about 100° C. (about 160° F. to about 212° F.). A most suitable temperature at which to carry out the interesterification within the reaction vessel is approximately midway within this range. Vacuum conditions within the vessel range between about 5 mbar and about 100 mbar (between about 4 mm Hg and about 75 mm Hg). Preferably, the level is within the lower portion of this range, or less than about 40 mbar (about 30 mm Hg), most preferably at or below about 26.7 mbar (about 20 mm Hg).

Reaction time will range between about 30 minutes and about 2 hours. An especially suitable reaction time is about 45 minutes. This reaction time can be controlled, for example, by timed neutralization of the catalyst. Neutralization for a catalyst such as sodium methoxide can be accomplished with 0.7 weight percent of citric acid solution of 42 percent strength.

The interesterified structured lipid can be treated to remove any residual soaps and/or to remove all the color bodies if needed. These include filter aids and silica sources such as TRISYL® S-615 (trademark, available from W. R. Grace & Co.) used for the refining of vegetable oil. Color removal can be with a bleaching earth or the like. The structured lipid also typically will be subjected to deodorization in accordance with approaches generally known in the art.

In preparing the pan release products, the interesterification structured lipid typically is combined with other components, the make up of which will be generally appreciated by those skilled in the art. In those situations where pan release spraying is by aerosol means, a propellant is included in the pan release composition. Other components include food grade surfactants and emulsifiers such as a lecithin. Other additives can include phospholated mono and diglycerides (PMDs), which are suitable for cooking under rugged conditions such as barbeque grilling. Water can also be a component of these sprayable formulations but is usually not required.

Included in components often used in pan release compositions are alcohols added to reduce viscosity. Alcohols which typically can be included within aerosol spray formulations are short chain alcohols, most typically grain alcohol or ethyl alcohol. It has been found that such viscosity modifiers need not be incorporated in pan release compositions according to the invention.

When included, one more of these components can be present in spray formulations which are not of the aerosol type, for example pump sprayers, squeeze-activated sprayers, or industrial sprayers for large-scale food manufacturing. It will be appreciated that the structured lipids are very advantageously incorporated into aerosol formulations which must exhibit low viscosity and contain relatively low melting edible oils.

The interesterified structured lipid according to the invention is combined with components such as these, as may be desired or necessary, in order to assist in propelling action characteristic of sprayed compositions for food service industry applications. The structured lipid is the component which provides the primary pan release functions in such compositions. This lessens the importance of other typical components such as the alcohols noted above. The structured lipid provides the smoke point levels needed for a pan release product. The structured lipid also has the advantageous low viscosity needed for a composition to be delivered by some form of spraying. Higher viscosities would cause clogging of spray nozzles or other outlets.

Pan release compositions according to the invention include the structured lipid at levels between about 60 and about 100 weight percent, based upon the total weight of the pan release product. Typically the structured lipid will be present at between about 70 and about 97 weight percent of the pan release product. When no propellant is required for a product, the structured lipid typically is between about 85 and about 100 weight percent, based on the weight of such a product, preferably between about 90 and about 98 weight percent of the product.

With further reference to components in addition to the interesterified structured lipid according to the invention, specific details concerning the make up of other components for pan release compositions can be found in U.S. Pat. No. 3,928,056, U.S. Pat. No. 4,108,678, U.S. Pat. No. 4,371,451, U.S. Pat. No. 5,156,876, U.S. Pat. No. 5,370,732, U.S. Pat. No. 5,374,434, U.S. Pat. No. 5,431,719, U.S. Pat. No. 5,503,866, U.S. Pat. No. 5,567,456, U.S. Pat. No. 5,662,956, U.S. Pat. No. 6,210,743, U.S. Pat. No. 6,403,144 and U.S. Pat. No. 6,544,574. As noted previously, each of these patents is incorporated by reference hereinto.

Especially in those products which are intended for aerosol delivery, one or more propellants will be included. These are generally categorized as pressurized gas, liquefied gas, soluble gas dissolved in the liquid of the product, and other propellant types. Perhaps the currently most common propellant is nitrous oxide. An often used propellant is isobutane. Another is carbon dioxide, and another is nitrogen. Dimethyl ether also is a known propellant. Propellants containing paraffin-series hydrocarbons and alkanes such as propane and isobutane are suitable propellants for these types of pan release products. Generally, conventional hydrocarbon propellants can be less than totally desirable for food uses. Fluorocarbons, which are normally gaseous, tend to be disfavored for environmental reasons and due to governmental regulations.

By regulation, volatile organic compounds (VOC's) cannot exceed 18 percent for cooking sprays. The present invention which allows cooking sprays to be formulated without grain alcohol achieves very good spray performance at a VOC of less than 18 percent.

Depending upon the particular pan release composition being formulated, propellants can be at levels as high as 75 percent or above and as low as about 10 percent by weight, based upon the total weight of the product. Typically, propellants comprise no more than about 25 percent by weight of the total weight of the pan release product.

If a lecithin component is included as a modifier for the pan release composition, it typically would be present at a level lower than lecithin in pan release compositions in which lecithin is the primary anti-stick component. Levels are from 0 to about 15 percent by weight. Lecithin products can vary somewhat in their make-up, depending upon their source and/or supplier. For example, soybean lecithin is obtained as a byproduct in the manufacture of soybean oil. Phosphate or solids content varies within lecithin products. Generally, such phosphate or solids content or contents are important to any lecithin function in a pan release composition. Lecithin products generally are available in standard and in heat resistant formulations. At times herein, the heat resistant lecithins are referred to as HR lecithin, while standard lecithins are referred to simply as lecithin.

With these variables in mind, when lecithin is included in the present products, same will be at a level of between about 0.5 and about 15 percent by weight, based upon the total weight of the product. When present, lecithin products preferably are within a range of about 2 and about 12 percent by weight, based upon the total weight of the product.

From 0 to about 15 percent by weight of glycerides preferably are incorporated into the composition as modifiers. Suitable glycerides are phosphated mono-and diglycerides. At times, these are referred to herein as PMD components.

In preferred compositions, both PMD components and lecithin components are included as modifiers. With such compositions, each of the PMD component and of the lecithin component are present at a level of between about 0.5 weight percent and about 10 weight percent, based upon the total weight of the pan release composition.

Humectants can be possible components of typical pan release compositions. Usually these will be at levels of about 4 percent or less by weight, based upon the total weight of the product. Examples include polyhydric alcohols such as glycerol, sorbitol, propylene glycol, and the like.

At times, a suspending agent can be included in the pan release product at relatively low levels. For example, stearates, silicates and the like can be included at levels on the order of about 0.5 to about 2 percent by weight, based upon the total weight of the pan release product.

Modifying agents also can be included in order to prepare a pan release product having certain sensory properties or shelf stability properties. These include flavorants, colorants, antioxidants, preservatives, inhibitors, and the like. Levels of use will depend upon the result desired and will be generally appreciated by those skilled in the art.

Some pan release compositions rely upon water as an inexpensive solvent which readily evaporates upon contact with a hot surface. At times, water can also perform the function of a carrier and/or as a component of an emulsion system. For example, when a lecithin component is included, water will be useful in partially hydrating the phosphatide portion of the lecithin material. Water also can serve as a humectant. Because of these wide variations in the function of water within a pan release composition and the manner by which the pan release composition is delivered, either on a consumer level or within an industrial food preparation operation, water amounts can very considerably. Some formulations will include water at a level approaching 75 percent by weight, based upon the total weight of the product composition. In other formulations, the amount can be on the order of 50 percent by weight or less. A somewhat general range is between about 0.2 and about 22 percent by weight, based upon the total weight of the product composition. When water is used purely as a humectant, it typically would be at a level of 1.5 percent or less by weight, based upon the total weight of the product.

Brookfield viscosity measurements for the compositions should be between about 20 and about 52 centipoise when measured at 20° C. with a No. 4 spindle at 50 rpm. Preferably, the range is between about 30 and about 50 centipoise, most preferably between about 35 and about 48 centipoise.

Examples now are provided in order to illustrate the concepts of the invention with a certain degree of specificity.

EXAMPLE 1

A batch reaction to prepare a structured lipid component was carried out within a reactor vessel having heating means, agitation means and pressure reduction capabilities. The reactant charge was 50 percent by weight of a medium change triglyceride (NEOBEE®1053) and 50 percent by weight of identity preserved canola oil. A sodium methoxide catalyst (95 percent pure) was added at 0.15 percent by weight of the edible oil reactant charge. The interesterification reaction was allowed to proceed for 45 minutes at a temperature of 90° C. and a pressure of 19 mm Hg. At the end of the reaction time, neutralization was carried out with 0.7 percent by weight of citric acid solution of 42 percent strength by weight.

The thus-formed interesterified structured lipid was treated with 1 percent by weight TRISYL® S-615 plus 1 percent by weight of a filter aid. Mixing proceeded for about 8 minutes at 90-94° C., followed by filtration. This was observed to have removed all of the soap residue. The structured lipid also was bleached with 0.5 percent of bleaching earth and 0.5 percent of a filter aid in order to ensure that all color bodies were removed.

Deodorization was carried out as follows. The structured lipid was subjected to a temperature of about 230° C. under a vacuum of 2.66 mbar (2 mm Hg). Steam was introduced at the rate of 0.4 volume percent of steam per hour. Deodorization treatment time was four hours.

The structured lipid was analyzed and found to have the following characteristics. No soap was detected. The smoke point was 210° C. (410° F.). The viscosity was measured with a Brookfield viscometer at 20° C., using the No. 4 spindle at 50 rpm. The viscosity reading for this structured lipid was 22 centipoise.

Good product stability was indicated by a free fatty acids value of 0.03. The peroxide value was 0.2. The oxidative stability index (OSI) was 15.5 hours at 110° C. The solids fat content (SFC) at 10° C. was 0.32, indicating that the structured lipid was liquid at this temperature. The anisidine value was comfortably low, at 0.85. The color measurement according to PFX880 5¼ was 7.5Y/1.3R.

This structured lipid provided an excellent cooking spray component in a pan release composition including a conventional type of propellant system.

The same MCT and identity preserved canola oil in the same proportions were made up into a physical blend. The Brookfield viscosity at 20° C., with spindle No. 4 at 50 rpm, was 40 centipoise, and the smoke point was 154.4° C. (310° F.). The canola oil, prior to blending, had a viscosity of 68 centipoise measured in the same manner.

EXAMPLE 2

A structured lipid was made substantially in accordance with Example 1. The charge was 50 percent identity preserved canola oil and 50 percent NEOBEE® 1053 MCTs oil. Interesterification and deodorization proceeded. The structured lipid had a smoke point of 207° C. (405° F.). Further analysis showed an SFC at 10° C. of 0.55, an Iodine Value of 49.5 and an OSI of 10.65 hours at 110° C. Its peroxide value was less than 0.1, and the free fatty acids were at 0.02. C8 analysis was 18.54 percent, and C10 analysis was 17.41 percent, with percent trans being 0.84 percent. Analyzed total saturates was 41.93 percent. This structured lipid was formulated into a pan release composition containing 99.4 weight percent of the structured lipid and 0.6 weight percent of lecithin.

The Brookfield viscosity was 22 centipoise at 20° C., using spindle No. 4 at 50 rpm. The viscosity of the structured lipid formulated with 5.6 percent lecithin was 44 centipoise at 50 rpm. The viscosity of a commercial pan release composition (PAM®) was 40 centipoise at 50 rpm.

In a release test, the structured lipid and release formulation gave a value of 0.81 gram when subjected to a release test for determining fat content. The PAM® release product tested at 0.71 gram. By this release test, the product is delivered by aerosol spray for one second at a distance of 6 to 12 inches in front of an unheated 10 inch cooking pan. This quantity of product then is analyzed for fat content.

This pan release formulation was tested as follows. A cooking pan was heated to a surface temperature of about 157° C. (about 315° F.). The pan release composition (4 cc) was placed in the center of the pan and was allowed to heat for 30 seconds, the pan release composition being at about 160° C. (320° F.). An egg was cracked on top of the heated pan release composition. Cooking commenced for one minute and 30 seconds, after which the pan was tilted, and the cooked egg slid out of the pan and onto a plate.

The following observations were made. No sticking was observed in the pan during the cooking process. No residual materials were left in the pan. Tasting of the egg indicated good mouth lubricity and did not give off a greasy feeling. The overall taste was clean.

EXAMPLE 3

Chemical interesterification was carried out substantially in accordance with Example 1. The charges were 65 percent by weight of BUNGE® non-hydrogenated corn oil and 35 percent by weight of C8/C10 medium chain triglyceride. The resulting structured lipid was treated to remove soaps and subjected to deodorization. The color measurement was 8.0Y/1.0R.

Analysis showed that the Brookfield viscosity was 48 centipoise at 20° C. with a spindle No. 4 at 50 rpm. The smoke point was 214.5° C. (418° F.).

EXAMPLE 4

Soybean oil and MCTs were charged to a reaction vessel at a ratio of 65:35 of soy:MCT. The resulting interesterified structured lipid had a viscosity of 44 centipoise at 20° C. on the Brookfield viscometer with spindle No. 4 at 50 rpm. The smoke point was 213.3° C. (416° F.). The color measurement was 13.0Y/2.0R. When made up into a physical blend product in the same proportions, the same oil and MCT had a Brookfield viscosity at 20° C., with spindle No. 4 at 50 rpm, of 56 cp, and the smoke point was 179° C. (354° F.). The soybean oil, prior to blending, had a viscosity of 60 cp measured in the same manner.

EXAMPLE 5

Interesterification was carried out on a charge of 32.5 weight percent corn oil, 32.5 weight percent cottonseed oil, and 35 weight percent MCTs. The corn oil had a Brookfield viscosity of 64 cp measured as in Example 1. After proceeding substantially in accordance with Example 1, the thus prepared structured lipid had a Brookfield viscosity at 20° C., with spindle No. 4 at 50 rpm, of 48 centipoise. The smoke point was 201° C. (394° F.). The color measurement was 22.0Y/2.9R. When made into a physical blend product in the same proportions, these same components gave a Brookfield viscosity of 56 cp and a smoke point of 176.7° C. (350° F.), measured in the same manner.

EXAMPLE 6

BUNGE® corn oil (65 weight percent) and 35 weight percent MCTs having 70 percent C10 were subjected to a randomizing interesterification reaction substantially in accordance with Example 1. The resulting structured lipid had a Brookfield viscosity of 48 cp with the No. 4 spindle at 50 rpm, at 20° C. The smoke point was 199° C. (390° F.). The color measurement was 9.0Y/1.5R.

EXAMPLE 7

A charge into the interesterification process substantially in accordance with Example 1 was as follows: soybean oil at 40 weight percent, cottonseed oil at 25 weight percent, and MCTs at 35 weight percent. The resulting structured lipid had a Brookfield viscosity of 48 centipoise with spindle No. 4 at 50 rpm and at 20° C. The smoke point was 198° C. (388° F.). The color measurement was 22.0Y/3.3R. A physical blend product made of these same components in the same proportions had a Brookfield viscosity under the same conditions of 56 cp and a smoke point of 172° C. (342° F.).

EXAMPLE 8

A charge into the interesterification process substantially in accordance with Example 1 was as follows: soybean oil at 60 weight percent, cottonseed oil at 25 weight percent, and MCTs at 15 weight percent. The resulting structured lipid had a Brookfield viscosity of 40 centipoise with spindle No. 4 at 50 rpm and at 20° C. The smoke point was 203.3° C. (398° F.). The color measurement was 22.0Y/3.5R. A physical blend of these same components in these proportions had a Brookfield viscosity of 48 cp and a smoke point of 183° C. (362° F.), measured in accordance with this Example.

EXAMPLE 9

Soybean oil and MCTs were charged to a reaction vessel at a ratio of 75:25 of soy:MCT. The resulting interesterified structured lipid had a viscosity of 44 centipoise at 20° C. on the Brookfield viscometer with spindle No. 4 at 50 rpm. The color measurement was 4.5Y/1.9R. The smoke point was 210° C. (410° F.). A physical blend of these components in these same proportions gave a Brookfield viscosity of 56 cp and a smoke point of 175.5° C. (348° F.), measured in accordance with this Example.

EXAMPLE 10

Canola oil (Natreon identity preserved oil) and MCTs were charged to a reaction vessel at a ratio of 60:40 of oil:MCT. The resulting interesterified structured lipid had a viscosity of 44 centipoise at 20° C. on the Brookfield viscometer with spindle No. 4 at 50 rpm. The smoke point was 197.8° C. (388° F.). A physical blend product of these components at these proportions had a Brookfield viscosity of 48 cp and a smoke pint of 187.8° (370° F.), measured according to this Example.

EXAMPLE 11

Interesterification was carried out on a charge of 70 weight percent canola oil (Natreon oil) and 30 weight percent MCTs. After proceeding substantially in accordance with Example 1, the thus prepared structured lipid had a Brookfield viscosity at 20° C., with spindle No. 4 at 50 rpm, of 48 centipoise. The smoke point was 202° C. (396° F.). A same-proportion physical blend product of these had a Brookfield viscosity of 52 cp and a smoke point of 182.2° C. (360° F.) measured according to this Example.

EXAMPLE 12

BUNGE® corn oil (70 weight percent) and 30 weight percent MCTs were subjected to a randomizing interesterification reaction substantially in accordance with Example 1. The resulting structured lipid had a Brookfield viscosity of 48 cp, with the No. 4 spindle at 50 rpm, at 20° C. The smoke point was 214.4° C. (418° F.). A same-proportion physical blend of these had a Brookfield viscosity of 48 cp and a smoke point of 180° C. (356°) measured according to this Example.

EXAMPLE 13

A charge into the interesterification process substantially in accordance with Example 1 was as follows: canola oil at 60 weight percent and MCTs at 40 weight percent. The resulting structured lipid had a Brookfield viscosity of 40 centipoise with spindle No. 4 at 50 rpm and at 20° C. The smoke point was 194.4° C. (382° F.). A physical blend of these components in the same proportion, when tested according to this Example, gave a Brookfield viscosity of 44 cp and a smoke point of 175.5° C. (348° F.). Canola oil, before blending or reaction, had a viscosity of 64 cp, measured in the same manner.

EXAMPLE 14

A charge into the interesterification process substantially in accordance with Example 1 was as follows: canola oil at 70 weight percent and MCTs at 30 weight percent. The resulting structured lipid had a Brookfield viscosity of 40 centipoise with spindle No. 4 at 50 rpm and at 20° C. The smoke point was 212.2° C. (414° F.). A physical blend of these reactants in the same proportion, when tested according to this Example, gave a Brookfield viscosity of 48 cp and a smoke point of 180° C. (356° F.).

EXAMPLE 15

The following components were interesterified generally in accordance with Example 1 to prepare a structured lipid of 70 weight percent soybean oil and 30 weight percent MCT. This structured lipid was made up into three pan release compositions. One combined the structured lipid with 3.5 weight percent HR lecithin. Another combined the structured lipid with 10 weight percent lecithin. A third composition combined the structured lipid with 6 percent PMD. Each component was heated, and the respective composition blends were formed.

Each composition was subjected to performance testing, as were other commercially available pan release compositions. These commercial products included EZ COAT® clear spray of Bunge Foods Corporation. This is a composition of partially hydrogenated winterized soybean oil, partially hydrogenated winterized canola oil, lecithin, and a propellant. Another composition was PAM® spray of ConAgra, a composition of canola oil, grain alcohol from corn, lecithin, and a propellant. Another was PURE AND SIMPLE® baking spray of Follmer Development, which composition has canola oil, soybean oil, capric/caprylyc triglycerides, phosphated mono-diglycerides, calcium stearate, silicon dioxide, and a propellant. The compositions were subjected to performance testing as follows:

Residue Tests and Cleaning Tests

An oven was preheated to 425° F. A sheet pan was sprayed with five different compositions of this Example 15 and baked in the preheated oven for 20 minutes. Each sheet pan was allowed to cool and evaluated for residue build up on the pans. This procedure was repeated two additional times. After each baking cycle, each pan was evaluated for lightness or darkness of residue color, with a score of 1 indicating very light in color, and a score 10 indicating very dark in color. The results were as follows.

The EZ COAT® pan spray had scores of 6, 6 and 7. The PAM pan spray had scores of 7, 7 and 8. These scores compared generally well with the composition of structured lipid and HR lecithin, which had scores of 8, 8 and 9.

The composition of structured lipid and standard lecithin was superior in residue lightness of color, with scores of 4, 4 and 5. The pan release composition of structure lipid and PMD gave an exceptionally light residue color, having scores of 2, 2 and 3.

The residues left by each of five compositions were subjected to a cleaning test. Using a mild soap, warm water and a non-abrasive sponge, the cooking surface was gently wiped and rinsed. Each was patted dry with a cloth towel and observations were recorded for each. Each of the three structured lipid pan release compositions cleaned easily with very little residue remaining on the cooking surface. Of these, the structured lipid composition including the PMD component cleaned the easiest of all of the samples, including those of the commercially available products. For each of the EZ COAT® clear pan spray and PAM pan spray, most of the residue remained on the cooking surface after the cleaning procedure. The conclusion was reached that all three of the structured lipid compositions produced a residue that was easily cleaned with mild soap and a non-abrasive sponge, while the commercial compositions were not.

This residue color test was repeated, this time including two additional commercially available pan sprays. The comparative pans sprays were EZ COAT® pan spray, the PAM pan spray, PAM "Original" pan spray, and the PURE AND SIMPLE® baking spray. The results were similar, with the PURE AND SIMPLE® spray testing as well as the structured lipid with PMD composition. The procedure was varied in that each sheet pan was brushed with a pastry brush in order to spread the product thinly onto the sheet pan prior to baking. Both the structured lipid plus PMD pan spray and the PURE AND SIMPLE® pan spray had scores of 3, 4 and 5. The EZ COAT® pan spray had scores of 5, 6 and 6. The PAM pan spray had scores of 7, 8 and 8, while the PAM Original pan spray had scores of 6, 7 and 8. The structured lipid with HR lecithin had scores of 6, 7 and 8. The structured lipid with standard lecithin had scores of 7, 7 and 8.

The cleaning test was conducted on the residue from these seven formulations. Each of the three structure lipid pan release compositions were observed to wash easily with mild soap and warm water with a little dark brown residue remaining. Of the four commercial compositions, the one with the most favorable observation was the PAM pan spray which washed easily with mild soap and warm water but some dark brown residue remained. The PURE AND SIMPLE® baking spray was observed to have had some residue removed with mild soap and warm water, but with brown residue remaining. The EZ COAT® clear pan spray was observed to be difficult to wash off with mild soap and warm water, with much dark brown residue remaining. The PAM Original pan spray was observed to be difficult to wash with mild soap and warm water, with most of the dark brown residue remaining.

Bake Test

A bake test was performed on six pan spray compositions which included the three structured lipid compositions of this Example 15, as well as EZ COAT® clear pan spray, PAM pan spray, and PAM Original pan spray. A muffin batter was prepared, and an oven was preheated in accordance with directions for the muffin batter. Muffin tins were sprayed with a thin film of each respective pan spray composition, making sure that both bottom and sidewalls of the tin were coated. Each muffin cup was filled to half capacity with the muffin batter, and baking and cooling was carried out as directed by the muffin mix baking instructions.

All muffins had an appearance that was golden brown, with nice peak. Each muffin tin was inverted and shaken one time in an attempt to release muffins. The number of muffins released was counted and recorded. Up to 10 total shakes were carried out, and the number of muffins released after each shake was observed and recorded. The best release performance according to this testing was achieved by the structured lipid plus lecithin pan release composition inasmuch as the first shake released 9 muffins and the second shake released the remaining 3 muffins. Favorable results were achieved by the PAM Original pan release product, for which 6 muffins were released with the first shake, 5 muffins were released with the second shake, and the last muffin was release with the third shake. For the EZ COAT® pan release test, all of the muffins released after six shakes. For the remaining compositions, at least 2 muffins remained in the pan.

After release, each tin was examined for food residue remaining, with the structured lipid plus HR lecithin, structure lipid plus lecithin, EZ COAT® pan spray, and PAM Original pan spray being judged as having slight residue remaining. The structured lipid plus PMD composition and the PAM pan spray were observed to have residue remaining with some of muffins not releasing at all.

Oven Darkening Test

An oven was preheated to 350° F. for approximately 45 minutes. A sample of 5.76 grams (or 6 cc) of each of seven pan spray compositions was placed on the bottom of a one pound aluminum loaf pan. Each sample was placed into the oven on a sheet pan, and each sample was thus heated for twenty minutes at 350° F. Each sample then was removed from the oven and allowed to cool, and each sample was evaluated for color from lightest to darkest. Proprietary color tube standards were used to assist the evaluation. Further color evaluation was carried out by a Gardener color analysis.

The sample compositions evaluated were the structured lipid with HR lecithin composition, the structured lipid with lecithin composition, and the structured lipid with PMD composition, each as specified earlier in this Example 15. Also sampled were the EZ COAT® clear pan spray, the PAM pan spray, the PAM Original pan spray, and the PURE AND SIMPLE® baking spray, each as noted earlier in this Example 15.

The evaluations each were run again, but at different oven temperatures, namely at 400° F. and at 450° F. The composition of structured lipid and PMD remained lightest in color after heating at each of the three temperatures. The color tube readings were 2 (with a 1 reading being the lightest on the scale) at all three of the heating temperatures. This was observed as being a clear light yellow liquid at 350° F. and 400° F. and a clear yellow liquid at 450° F. The structured lipid plus HR lecithin remained lighter, but not as light, the color tube readings being 3, 4 and 5 at the respective heating temperatures. It was observed as a clear yellow liquid at 350° F. and 400° F. and as a clear dark yellow liquid at 450° F. The PURE AND SIMPLE® baking spray also remained lighter, its color tube numbers being 2, 2 and 3 at the respective heating temperatures. This was observed as being a clear yellow liquid at 350° F. and 400° F. It was observed to be a clear slight dark yellow liquid at 450° F.

These three formulations remained lighter at all heating temperatures than each of the remaining four samples. The structured lipid plus lecithin composition gave a color number of 7 at all three temperatures and was observed to be a clear dark brown liquid at 350° F. and 400° F. It was observed to be a dark brown liquid with black particulates after heating at 450° F. The EZ COAT® pan spray had color numbers of 5, 6 and 7, respectively. The PAM pan spray had a color number of 7 at each temperature, which was also the case for the PAM Original pan spray. EZ COAT® was observed to be a clear dark yellow liquid at 350° F., a clear light brown liquid at 400° F., and a clear dark brown liquid at 450° F. The two PAM pan sprays were observed as being a clear brown liquid at 350° F., a clear dark brown liquid at 400° F., and a dark brown liquid with black particulates at 450° F.

These evaluations showed that the structured lipid compositions each fared well through the oven darkening test, and in most cases better than the commercial pan release compositions.

Egg Release Test

A frying pan was sprayed with each of the seven pan spray formulations of this Example 15. In each case, shaking directions were followed, and the can was held about 8 inches from the pan during spraying, which continued until the surface of the pan was covered. An Atkins surface thermometer was used to adjust flame so the pan heat was between 310° F. and 320° F., at which time each egg was placed into the pan. The egg was permitted to cook for about 1.5 minutes on the first side. The pan was gently swirled to check if the egg stuck in place. Where possible, the egg was slid out of the pan. Where the egg would not slide out, a spatula was used to remove the egg from the pan.

The food release characteristics for each of the seven samples was observed and recorded. The pan was washed prior to each cooking test. All samples were found to perform well in egg releasing application, there being no sticking during two runs for each sample. In each case, the egg slid out readily.

Pancake Release Test

The same seven pan spray compositions of the egg release test were used for a pancake release test. In this case, a pancake mix was prepared for cooking according to directions on the package. The Atkins surface thermometer was used to set the flame so the pan was heated between 375° F. and 400° F. After the container of each composition was shaken, 3 cc of each sample was used to coat the pan surface. One-third cup of pancake batter was poured into the center of the pan and allowed to cook until bubbles appeared at the batter surface. The pan was gently swirled to check for pancake sticking. For the pancakes which easily slid, the pancake was flipped over without a spatula and allowed to cook for 1 minute before removing from the pan. For the pancakes which stuck slightly, a spatula was used to flip the pancake over. After flipping, cooking was continued for 1 minute before removing the pancake from the pan. Each pancake was slid out of the pan, assisted by a spatula if it did not slide out.

After those runs when the pancake removed completely from the pan, additional pancakes were fried in the same manner, without re-spraying. This process continued until 15 pancakes had been cooked with each pan spray composition, until a pancake stuck and could not be turned, or until severe black charring was noted on the pan cooking surface.

The best performer in this pancake release test was the structured lipid plus lecithin composition. A degree of sticking was judged as being in the category of barely sticking, with the spatula needed to remove the pancake. This was designated as having a degree of sticking number of "1". On this scale, a sticking number of "0" indicates no sticking throughout the test. More specifically, the first and second pancakes slid out without requiring the spatula, and the third pancake released without requiring the spatula, with black charring being noted. A total of three pancakes were fried.

For the structure lipid plus PMD composition, a total of three pancakes were fried. It was assigned a degree of sticking number of "2". The first pancake slid out without the spatula, the second pancake slid out without the spatula, with some charring being observed, and the third pancake stuck to the pan, and additional charring was observed.

The structured lipid with HR lecithin sample had a degree of sticking number of "1". Two pancakes were fried. The first pancake slid out without the spatula, the second pancake needed assistance from the spatula.

Each of the commercially available pan release products fried three pancakes and gave a degree of sticking number of "2". For all four of them, the first and second pancakes slid out without the spatula, and for the PAM Original pan spray and the PURE AND SIMPLE® baking spray, some charring was observed with the second pancake. The third pancake stuck, and charring was observed for the EZ COAT® and PAM pan spray compositions. For the PAM Original pan spray and the PURE AND SIMPLE® baking spray products, the third pancake stuck, and excessive charring was observed.

After cooking was completed, the residue left in the pan was recorded. For each of the three structured lipid pan release compositions, very little residue remained. Quite a bit of residue remained for the EZ COAT®, PAM Original, and PURE AND SIMPLE® pan spray products. Some residue was apparent for the PAM pan spray product, but not as much as the other commercial products and more than the structured lipid products.

These tests illustrate that the structured lipid pan release compositions compared favorably when compared with the commercially available products during the pancake release testing. The structured lipid compositions performed in a superior manner in terms of residue left after the completion of the pancake frying.

EXAMPLE 16

Pan release compositions were prepared as follows. A structured lipid was made in accordance with Example 1 from 70 weight percent of soybean oil and 30 weight percent of MCT. In one composition, this structured lipid was blended with 3 weight percent Centrophase HR6B (available from Central Soya) HR lecithin plus 3 weight percent of Lambent PE-130K PMD. Another composition combined the structured lipid with 3 weight percent Centrophase 152 (available from Solae LLC) standard lecithin plus 3 weight percent of PE-130K PMD (Lambent Technologies). A third structured lipid composition was prepared which included 6 weight percent Centrophase HR lecithin. Each composition was slowly mixed and stirred and stored in trigger sprayers.

Oven Darkening Test

The three structured lipid compositions noted above were tested along with PURE AND SIMPLE® baking spray and EZ COAT® clear pan spray by running through an oven darkening test. An oven was preheated to 350° F. for approximately 45 minutes. A sample of each pan release composition (5.76 grams or 6 cc) was sprayed into the bottom of a 1 pound aluminum loaf pan. Each was placed onto a sheet pan and heated in the oven for 20 minutes at 350° F. After removing from the oven and allowing to cool, each sample was evaluated for color, and samples were identified from the lightest to the darkest. This procedure was repeated for each sample at two additional temperatures, namely 400° F. and 450° F. The same proprietary color tube standards of Example 15 also were used in this test.

The color test results were generally mixed and indicated that the structured lipid compositions fared about the same as the PURE AND SIMPLE® pan spray and not quite as well as the EZ COAT® pan spray. For the EZ COAT® pan spray, the color tube numbers at the three temperature ranges were 2, 2 and 3, respectively. For the PURE AND SIMPLE® baking spray, the color tube numbers were 4, 5 and 7, respectively. The structured lipid with standard lecithin composition generally performed better than the other two structured lipid compositions, with its color tube numbers being 3, 4 and 6, respectively. For the structured lipid with HR lecithin plus PMD composition, the color tube numbers were 4, 5 and 6, respectively. For the structured lipid with lecithin plus PMD, the color tube numbers were 6, 6 and 7.

A Gardener LCS LICO 200V1.20 calorimeter was used to obtain color measurements for each of these five pan spray compositions. This Gardener color testing confirmed the results and conclusions drawn from the proprietary color tube evaluations.

The oven darkening test was repeated, while adding another commercially available pan spray, namely GOLD-N-SWEET® premium pan spray of Ventura Foods, believed to be in accordance with U.S. Pat. No. 5,156,876, incorporated by reference hereinto. This commercial pan spray has corn oil, PMD, calcium carbonate, silicon dioxide, artificial butter flavor, beta carotene and NFC propellant.

The overall results were similar. The structured lipid with HR lecithin and PMD were at a color tube number of 4 (golden brown color) at 350° F., a color tube number of 5 (dark golden brown) at 400° F., and a color tube number of 5 (dark golden brown) for the 450° F. test. The structured lipid with lecithin and PMD gave a color tube number of 6 (brown color) at 350° F., of 7 (dark brown) at 400° F. and at 450° F. The structured lipid plus HR lecithin gave a color tube number of 3 (golden) at 350° F., of 5 (dark golden brown) at 400° F., and of 6 (brown) at 450° F. The EZ COAT® pan spray had a color tube number of 5 (dark golden brown) at 350° F., of 4 (golden brown) at 400° F., and of 6 (brown) at 450° F. The PURE AND SIMPLE® baking spray had a color tube number of 2 (golden yellow color) at 350° F. and at 400° F., and of 3 (golden) at 450° F. The GOLD-N-SWEET® pan spray had a color tube number of 2 (opaque golden yellow) at 350° F. and at 450° F., and a color tube number of 4 (opaque golden brown) at 450° F.

Gardener color measurements were obtained for these samples. These results were similar to the results and observations made in accordance with the color tube system noted above.

Ring Cake Test

Release tests were run on the same five pan release compositions used in the oven darkening test of this Example 16. A batter of RICHCREAM® base mix available from Bunge Foods Corporation was prepared according to mixing directions combining 5 lbs. of RICHCREAM® base mix with 28 oz. of whole eggs as a first stage. These were blended at 1 minute at a first, slow speed, followed by creaming for 3 minutes at a second, faster speed. The second stage added 24 ounces of salad oil and 18 ounces of cold water, the blending continuing for 1 minute at the first speed. After scraping down, blending for 3 minutes at the first speed continued, the batter temperature being between 68° F. and 72° F.

A cake pan was sprayed with each of the five pan spray compositions, holding the can about 10 inches from the cake pan bottom, spraying a thin film. Both the bottom and sidewalls of the cake pan were coated. Each cake pan then was filled with 18 ounces the batter and baked at 330° F. to 335° F. for 1 hour.

Each of the five compositions resulted in cake appearance, cake release, food residue and pan spray residue characteristics which were about the same in making each ring cake. All samples released the ring cakes well and produced golden brown cakes, with some residue, little residue or very little residue.

Egg Release Test

The five pan spray compositions of the ring cake test, plus GOLD-N-SWEET® premium pan spray, were subjected to an egg release test program. The egg release test was performed as noted in Example 15. In this case, the amount of pan spray was that provided by 4 pumps of the sprayer nozzle. Also, in this testing, the egg was allowed to cook for 2 minutes on the first side. The pan was gently swirled to determine if the egg stuck in place. The cooked egg was slid out of the pan. If it did not slide out, a spatula was used to remove the egg from the pan.

An evaluation of egg release characteristics for each sample was observed and recorded. All pan release compositions released the first egg well, with the structured lipid compositions performing somewhat better on the whole. Each of the structured lipid compositions had a degree of sticking of either "0" (no sticking, egg slides out readily) or "1" (barely sticks, amountoof egg left in the pan was the size of a pin head). The structured lipid with HR lecithin and PMD had the "0" degree of sticking, while the other two had the "1" degree of sticking. The degree of sticking for the PURE AND SIMPLE® baking spray also was "1", while that of the other two commercial pan release compositions had a "2" (egg sticks, several pin head size spots) degree of sticking.

Dishwashing detergent, water and a sponge were used to clean the pan after use for each of the pan release compositions. Each washed pan was observed and felt for any residue remaining. Each of the structured lipid with HR lecithin plus PMD and the structured lipid with HR lecithin compositions were the easiest to clean and left no residue. The structured lipid with lecithin plus PMD left the pan slightly harder to clean than the other two structured lipid compositions, with some residue remaining on the sides. For each of the three commercially available formulations, the pan was harder to clean than any of the structured lipid compositions, and some residue remained on the sides.

The same six pan release compositions were subjected to repeat egg release and wash testing. The same procedure was used, and similar results were observed. The structured lipid with HR lecithin plus PMD was the easiest to clean, and all six of the formulations exhibited about the same release attributes. More specifically, the degree of sticking for the first egg was a "1" for all but the structured lipid with lecithin plus PMD composition, which gave a "0" degree of sticking, and for the structured lipid with HR lecithin plus PMD, which gave a "2" degree of sticking. All three structured lipid compositions gave a degree of sticking of either "1" or "2", while the three, commercial compositions gave a degree of sticking of "1", "2", or "3" for the egg.

Concerning the washing test, the structured lipid with HR lecithin plus PMD cleaned easily, and no residue was observed, and the other two structured lipid compositions left some residue on the side of the pan after cleaning. All three of the commercial formulations left residue on the bottom and sides of the pan after cleaning.

Another repeat of the egg release test was conducted with the same pan release compositions. The conclusion reached was that all samples released the first egg well, while the compositions having the structured lipid were easier to clean. More specifically, the structure lipid with lecithin and PMD composition had a "0" degree of sticking for the first egg, whereas the remaining five compositions had a "1" degree of sticking for the first egg. For the second egg, the structured lipid with HR lecithin and PMD had a degree of sticking of "2", while the other two structured lipid compositions had a degree of sticking of "3" for the second egg.

For the second egg, all three of the commercial pan release products had a degree of sticking of "4" (moderate, more than the size of a quarter). For all three structured lipid compositions, some residue remained on the sides of the pan after cleaning. For the EZ COAT® pan spray, some residue remained on the bottom and sides of the pan, and for the other two commercial products, residue remained on the bottom and sides of the pan.

Pancake Release Test

The same six pan release compositions of this Example 16 were subject to pancake release testing. A pan suitable for making pancakes was heated to 350° F. to 375° F., and 2.6 grams (or 4 sprays) of each composition was used to coat the pan surface. One-third cup of pancake batter was poured into the center of the pan, and cooking proceeded for 1 minute. The pan was gently swirled to check for pancake sticking in place. For the pancakes which slid easily, they were flipped without a spatula and allowed to cook for an additional 1 minute before removing from the pan. For those pancakes which stuck slightly, a spatula was used to flip the pancake, which was allowed to cook for another 1 minute. The pancakes were slid out of the pan, with spatula assist, if needed. If the pancake removed completely from a pan, additional pancakes were fried without re-spraying. Cooking continued until 15 pancakes had been cooked or until a pancake stuck which could not be turned or if severe black charring appeared on the pan cooking surface.

All samples released the pancakes well. The most favorable degree of sticking which was observed during this testing was a number "1" (barely sticks, spatula needed to remove pancake). This condition continued through cooking 8 or 9 pancakes for the two structured lipid compositions having PMD, while the one having only HR lecithin maintained this degree of sticking for 5 pancakes. The EZ COAT® pan spray and the GOLD-N-SWEET® pan spray maintained this number "1" degree of sticking through 8 pancakes, while the PURE AND SIMPLE® baking spray maintained this level through 11 pancakes. A total of 15 pancakes were cooked for the PURE AND SIMPLE® and the GOLD-N-SWEET® pan spray products. A total of 13 pancakes were cooked with the structured lipid with lecithin plus PMD composition. A total of 12 pancakes were cooked with the structured lipid with HR lecithin plus PMD composition, and a total of 11 pancakes were cooked with the EZ COAT® pan spray and with the structured lipid with HR lecithin composition.

All samples left some residue in the pan after cooking was completed. The structured lipid with HR lecithin composition did appear to have some brownish to black food residue on the bottom of the pan and some brownish residue on the bottom of the pan. The other two structured lipid compositions were observed to have some brownish to black food residue on the bottom and sides of the pan and some brownish residue on the bottom and sides of the pan. All three commercial formulations were observed to have brownish black food residue on the bottom and sides of the pan. The EZ COAT® product had some brownish residue on the sides, and a little residue on the bottom of the pan, while the GOLD-N-SWEET® product had much brownish residue on the sides and some on the bottom of the pan.

The pans used for this pancake residue testing were cleaned using mild soap, warm water and a non-abrasive sponge. This was followed by gentle wiping and rinsing off of the pan cooking surface. Thereafter, drying was accomplished by patting with a cloth towel. All three structured lipid compositions were easier to clean than the commercial pan spray products. The structure lipid compositions containing lecithin plus PMD and containing HR lecithin were observed to have some residue remaining on the sides of the pan. The remaining structured lipid composition was observed to have some residue remaining on the sides and bottom of the pan. The EZ COAT® product had much residue remaining on the sides of the pan and some residue remaining on the bottom of the pan. The other two commercial products were observed to have much residue remaining on the sides and bottom of the pan after this washing operation.

Clean Residue Test

The six products of this Example 16 were sprayed on a cooking pan, holding the spray container about 10 inches from a sheet pan tin and spraying 1.5 grams of thin film of product in a line down the sheet pan. A basting brush was used to spread the sample evenly through a 4 inch by 12 inch surface area. An oven was preheated to 425° F., and the sheet pan was baked for 20 minutes in this preheated oven. After cooling, residue buildup on the pans was observed and evaluated. Residue buildup was ranked from a "1" to a "10", in increasing order of residue buildup. The pans each were baked a second and third time.

The structured lipid with HR lecithin plus PMD showed the overall best results, giving residue numbers of "2", "3" and "5" for the first, second and third bakings, respectively. The structured lipid with lecithin and PMD was good, but not quite as favorable, having residue appearance numbers of "3", "4" and "5", respectively, while the structured lipid with HR lecithin was somewhat less favorable, with residue appearance numbers of "3", "5", and "6", respectively. The residue appearance numbers for the EZ COAT® product were "4", "5" and "6", respectively. For the PURE AND SIMPLE® product, the residue appearance number was "4" in each instance. For the GOLD-N-SWEET® product, the appearance residue numbers were "2", "3" and "4", respectively.

The pans with these residues were evaluated for ease of cleaning. A mild soap, warm water and a non-abrasive sponge were used, followed by gentle wiping and rinsing of the cooking surface. This was followed by patting dry with a cloth towel.

All three structured lipid compositions were easily cleaned using these gentle cleaning procedures. This cleaning was more effective and easier for the structured lipid compositions when compared with the three commercial products. The structured lipid compositions were observed to wash off easily, with some residue was left on the cooking sheet. For the EZ COAT® product, more than half of the residue remained after this cleaning. For the other two commercial products, almost all of the residue remained after this cleaning.

Muffin Bake Test

The six pan release compositions of this Example 16 were subjected to bake testing. A muffin tin was sprayed with a thin film of each product during each test, the can having been held about 10 inches from the muffin tin, with the bottom and side walls being coated. All muffin cups were half filled with prepared muffin batter, baked and cooled as directed by the muffin mix instructions. All muffins were judged to be golden brown and had a nice peak and volume.

Each tin was turned over and shaken ten times, making note of muffin release after each shake. All tins were tapped on all sides prior to beginning the shaking sequence. All compositions were observed to release easily without leaving substantial residue. All twelve muffins were released after the first shake when using the commercial products and the structured lipid plus HR lecithin composition. For the structured lipid with lecithin plus PMD composition, eleven muffins released upon the first shake, with the twelfth muffin releasing upon the third shake. For the structured lipid and HR lecithin plus PMD composition, six muffins released on the first shake, one on each of the third, eighth and ninth shakes, two upon the tenth shake, with one remaining that was easily removed by hand.

EXAMPLE 17

Four structured lipid pan release compositions were prepared. The structured lipid in each case was the interesterification product of 70 weight percent soybean oil (IMPERIAL™ oil from Bunge Foods Corporation) with 30 weight percent ALDO™ MCT medium change triglycerides of AV=1 technical grade, available from Lonza. The reaction was carried out with a sodium methoxide powder catalyst at 0.1 to 0.5 weight percent, at a reaction temperature of 80° C. to 100° C. and under a vacuum of 5 to 100 mBAR (4-75 mm Hg). After a reaction time of from ½ to 2 hours, neutralization was carried out with 0.7 percent citric acid solution of 42 percent strength. After moisture was dried off, a Trisyl treatment was carried out, followed by bleaching. Deodorization was carried out in accordance with generally known conditions.

The resulting structured lipid was made up into pan spray compositions as follows. Composition A contained 80 weight percent structured lipid, 2.5 weight percent HR lecithin, 2.5 weight percent PMD, 2.3 weight percent propane and 12.7 weight percent isobutane. Composition B contained 77 weight percent structured lipid, 2.5 weight percent HR lecithin, 2.5 weight percent PMD, 2.7 weight percent propane and 15.3 weight percent isobutane. Composition C contained 80 weight percent structured lipid, 2.5 weight percent HR lecithin, 2.5 weight percent PMD, 6 weight percent propane, and 9 weight percent isobutane. Composition D contained 77 weight percent structured lipid, 2.5 weight percent HR lecithin, 2.5 weight percent PMD, 7 weight percent propane and 11 weight percent isobutane. Composition E contained 76 weight percent structured lipid, 6.5 weight percent HR lecithin, 2.5 weight percent PMD, and 15 weight percent of a propellant containing about 20 weight percent propane and about 80 weight percent isobutane. Composition F contained 73 weight percent structured lipid, 6.5 weight percent HR lecithin, 2.5 weight percent PMD, and 18 weight percent of a propellant containing about half propane and about half isobutane.

Egg Release Test

Egg release testing was conducted for structured lipid compositions A, B, C and D, as well as for NUTRA COAT®pan spray available from Bunge Foods Corporation and EZ COAT®clear pan spray available from Bunge Foods Corporation. The pan was gradually heated to between 310° F. and 320° F. An egg was added, and cooking proceeded for 2 minutes on the first side. The pan was gently swirled to check if the egg was sticking in place. This testing determined that all six compositions released the egg well and washed easily.

More particularly, the degree of sticking was "1" for each of the first and second eggs cooked with the structured lipid A and B compositions and with the NUTRA COAT® product. For the structured lipid C composition, the first egg had a "0" degree of sticking (no sticking, egg slides out readily) and a number "1" degree of sticking for the second egg. For the structured lipid D composition and for the EZ COAT® product, the number "2" degree of sticking was observed.

Clean Residue Test

A sheet pan tin was sprayed with 1.5 grams of a thin film of each pan release product of the egg release test, holding the can about 10 inches from the tin. Spraying was in a line down the sheet pan, and a basting brush was used to spread the sample evenly over a 4 inch by 12 inch surface area. This sheet pan was baked for 20 minutes in an oven preheated to 425° F. The appearance of residue was observed for a first, second and third bake.

All four structured lipid compositions remained lightest in color throughout all bakings when compared with the two control commercial pan release formulations. All four of the structured lipid compositions had a residue rating of "2" after the fist bake, of "3" after the second bake, and of "4" after the third bake. The NUTRA COAT® product had a residue rating of "2" after the first bake, "4" after the second bake, and "6" after the third bake, and the EZ COAT® product had a residue rating of "5" after the first bake, of "7" after the second bake, and of "9" after the third bake.

Pan cleaning was carried out using a mild soap, warm water and a non-abrasive sponge, followed by a gentle wiping and rinsing, patting dry with a cloth towel. All four of the structured lipid compositions were observed to wash easily with this mild cleaning approach. Both of the two control, commercially available pan spray products were observed to have much residue remaining after gentle cleaning.

EXAMPLE 18

Pan release compositions E and F prepared as specified in Example 17 were subjected to testing as noted below.

Muffin Bake Test

These two structured lipid composition and NUTRA COAT® pan spray and EZ COAT® clear pan spray each were used to coat the bottom and side walls of a muffin tin. In each instance, the can was held about 10 inches from the muffin tin, and a thin film spray was made. A prepared muffin batter was used to half fill each muffin cup. Baking and cooling were achieved as directed by the muffin mix directions. All four products performed well. The appearance of all muffins was judged to be good, with a nice peak and even browning. In each instance, all twelve muffins released from the inverted pan after a first shake. Each showed some food residue, and all cleaned easily with mild soap and a soft sponge.

Egg Release Test

The four pan spray compositions of this Example were sprayed into a frying pan. Each can was held about 8 inches from the pan and was sprayed for 7 seconds to cover the surface of the pan. A first egg was inserted into the pan at 310-320° F. and cooked for 2 minutes on the first side. The pan was gently swirled to check if the egg stuck in place.

The degree of sticking was evaluated by sliding the egg out of the pan, with spatula assistance if needed. A second egg was cooked in the same manner. Both of the structured lipid compositions exhibited a number "1" degree of sticking for both eggs. The NUTRA COAT® pan release product provided a degree of sticking of "0" for the first egg and "1" for the second egg, while the EZ COAT® pan spray product showed a degree of sticking of "2" for the first egg and "1" for the second egg.

Both of the structured lipid compositions washed easily with mild soap and a soft sponge. For both of the control commercial products, residue remained after the mild soap and sponge cleaning. Accordingly, the structured lipid compositions were judged to be favorable in release properties when compared with the control and better in cleaning properties when compared to the control.

Residue and Cleaning Tests

A sheet pan was sprayed with each of the four compositions of this Example 18, each can being held about 10 inches from the sheet pan 10 while spraying 1.5 grams to form a thin film, together with a basting brush being used to spread the sample evenly over a 4 inch by 12 inch surface area. This sheet pan was baked for 20 minutes in an oven preheated at 425° F. After cooling, each was evaluated for residue appearance. Baking was repeated for a second time and for a third time.

For the first bake, the residue was rated at "3" on a scale from 1-10 for all four of the compositions. After the second bake, the structured lipid compositions each had a "4" rating, while the control commercially available products each had a "5" residue rating. After the third bake, each of the structured lipid compositions had a residue rating of "6", while each of the control commercially available pan release compositions had a residue rating of "7". The residue rating was judged to be lighter (and thus better) for the structured lipid compositions than for the control products for the second and third baking test.

The pans were cleaned with mild soap, warm water and an non-abrasive sponge, followed by gentle wiping and rinsing of the sample residue off of the cooking surface. This was followed by patting dry with a cloth towel. Both of the structured lipid compositions were more easily cleaned than were the control products. More specifically, both structured lipid compositions were observed to clean easily, with little residue remaining around the edges. The NUTRA COAT® pan spray product was observed to have some residue remaining, mostly around the edges, while the EZ COAT® pan spray product was observed to have much residue remaining in the center and on the edges of the pan.

Clam Shell Grill Test

A clam shell grill (available from Star Manufacturing International Inc.) was used to test residue and cleaning capabilities of the two structured lipid compositions of this Example 18, as well as each of the NUTRA COAT® pan spray product and the EZ COAT® pan spray product. The grill was cleaned thoroughly and preheated to 425° F. The can of each product was held about 8 inches from the grill, and each pan release composition was sprayed both on the top and bottom surface of the grill. Two thawed chicken breast fillets were placed on the grill, smooth side up, and the clams shell grill top was lowered pressing firmly onto the fillets. The fillets were cooked for three minutes. Cooking to 165° F. was confirmed using a thermometer for 15 minutes. A total of 10 fillets were thus prepared.

The following conclusions were reached from these appearance observations. All four products released the chicken fillets from the grill similarly, with slightly less food residue remaining in the structured lipid composition F treated grill, which had the observation noted that little food residue remained on the bottom of the grill. The remaining three products were observed to have some food residue remain on the bottom of the grill.

The grill was cleaned, and the ease or difficulty of the cleaning was observed. Both of the structured lipid compositions E and F were observed to clean easily with mild soap and a mild brush. The NUTRA COAT® treated grill was shown to be slightly harder to clean with the same mild soap and brush, while the EZ COAT® treated grill was much harder to clean with the mild soap and brush. It was concluded that the structured lipid compositions were easier to clean off of the grill after this cooking cycle.

EXAMPLE 19

A structured lipid was prepared as specified in Example 17. A pan release composition was prepared from 92 weight percent of the structured lipid, 4 weight percent of HR lecithin (Centrophase HR 6B) and 4 weight percent PMD (Lamchem PE-130K), all percentages being based upon the total weight of the composition. For ease of application, a propellant was included to prepare a pan spray formulation as follows: 75.4 weight percent of the structured lipid, 3.3 weight percent of the HR lecithin, 3.3 weight percent of the PMD, about 9 weight percent propane and about 9 weight percent isobutane, all based upon the total weight of the pan spray formulation.

Clam Shell Grill Test

The structured lipid pan release formulation of this Example 19 was subjected to testing with a clam shell grill, together with comparative testing of commercially available control pan sprays, namely EZ COAT® clear pan spray and PAM® Original PAM spray. The clam shell grill was preheated to 425° F., and each pan spray was directed to the grill, holding each can about 8 inches from the grill, while lightly spraying both the top and the bottom surface of the grill. Two thawed chicken breast fillets were placed on the grill, smooth side up, and the grill top was lowered to press firmly onto the fillets. The fillets were fully cooked to 165° F. A total of 10 fillets were cooked in this manner for each pan spray test. The grill was thoroughly cleaned prior to initiating the testing for each pan spray. Observations were made as follows.

Concerning food residue on the grill, the structured lipid composition showed some brown food residue on the bottom of the grill surface. A similar observation was made for the EZ COAT® pan spray. For the PAM Original pan spray, the observations indicated more food residue, also brown, on the bottom of the grill surface.

Concerning ease of cleaning, the structured lipid product was easily cleaned with mild soap and water. Both of the control commercial products left the grill much harder to clean. A pan spray residue remained on the grill top surface after cleaning with mild soap and water. This illustrates that the structured lipid composition left a low amount of residue that was much more easily cleaned from the grill surface than when the commercial products were used.

Cleaning Residue Test

The structured lipid composition of this Example 19 was subjected to residue testing and cleaning testing in comparison with five commercially available pan spray products. These products were EZ COAT® clear pan spray, EZ COAT® foaming pan spray, PURE AND SIMPLE® baking spray, PAM® Original pan spray, and GOLD-N-SWEET® pan spray. For each pan spray, the can was shaken in accordance with directions on the can, which was held about 10 inches from a sheet pan tin. 1.5 grams of each pan spray were delivered in a thin film in a line down the sheet pan. A basting brush was used to spread the sample evenly over a 4 inch by 12 inch surface area. The sheet pan was placed into an oven preheated at 425° F. and baked for 20 minutes.

After cooling, a residue buildup evaluation was carried out. This was repeated for a second bake of the previously baked pan, followed by a third bake of the previously twice baked pan. Each residue build up was scored on a scale on 1 to 10, with a score of 1 indicating very light in color, and a score of 10 indicating very dark in color. The PURE AND SIMPLE® and the GOLD-N-SWEET® pan spray formulations gave the lightest residue color, followed by the structured lipid composition and the EZ COAT® foaming pan spray product. The EZ COAT® clear pan spray product and the PAM Original pan spray product showed the darkest residue at all three baking tests.

The sheet pan tins containing the residue from the previous bake testing were subjected to cleaning using a mild soap, warm water and a non-abrasive sponge. After washing, the sheet pan tin was gently wiped and rinsed to remove residue off of the cooking surface. The surface was patted dry with a cloth towel. Only the structured lipid composition cleaned easily with this mild soap and warm water cleaning. The observations indicated that some residue remained on the edges. Each of the commercial products were cleaned to a substantially lesser degree. None of them would clean with this mild soap and warm water cleaning operation. Much residue remained for the EZ COAT® foaming pan spray product, for the PURE AND SIMPLE® baking spray product, and for the PAM Original pan spray product. Almost all residue remained for the EZ COAT® clear pan spray product and for the GOLD-N-SWEET® pan spray product.

The overall conclusion of this Example 19 is that the structured lipid composition was at least about as effective as the commercially available pan sprays in reducing residue development and residue color darkening during clam shell grilling, while being decidedly easier to clean than the commercially available pan sprays tested.

EXAMPLE 20

The following components were interesterified generally in accordance with Example 1 to prepare a structured lipid of 70 weight percent corn oil and 30 weight percent MCT. This 70:30 structured lipid was made up into a pan release composition having 184 grams of the structured lipid with 8 grams (4 weight percent) HR lecithin (Centrophase HR 6B) and with 8 grams (4 weight percent) PMD (Lambent PE-130K)). Blending proceeded slowly for 20 minutes to form sample S1.

The same components were interesterified to prepare a structured lipid of 80 weight percent corn oil and 20 weight percent MCT. This 80:20 structured lipid was made up into a pan release composition having 184 grams of the structured lipid with 8 grams (4 weight percent) HR lecithin (Centrophase HR 6B) and with 8 grams (4 weight percent) PMD (Lambent PE-130K). Blending proceeded slowly for 20 minutes to form sample S2.

Both compositions were subjected to performance testing, as was a composition using only corn oil instead of a structured lipid. Also tested was a commercially available pan release composition. The former combined 184 grams of the same corn oil product used to make the two structured lipids together with 8 grams (4 weight percent) HR 6B and 8 grams (4 weight percent) PE-130K PMD. This was designated as S3. The commercial product was ACH MAZOLA® corn oil pan spray, designated as S4. The four compositions were subjected to performance testing as follows:

Residue Test and Cleaning Test

An oven was preheated to 425° F. A sheet pan was sprayed with the four different compositions of this Example 20 and baked in the preheated oven for 20 minutes. The sheet pan was allowed to cool and evaluated for residue build up. This procedure was repeated two additional times. After each baking cycle, the pan was evaluated for lightness or darkness of residue color, with a score of 1 indicating very light in color, and a score 10 indicating very dark in color. The results were as follows.

All four pan sprays had a score of 3 after the first baking cycle. After the second baking cycle, S1, S2 and S3 had a score of 5, while S4 had score of 7. After the third baking cycle, S1, S2 and S3 had a score of 6, and S4 had a score of 8. The S4 commercial composition did not perform as well as the other compositions.

The residues left by each of four compositions were subjected to cleaning testing as in Example 15. Both of the two corn oil based structured lipid pan release compositions (S1 and S2) cleaned easily with some residue remaining on the edges. For the S3 corn oil composition, much residue remained after cleaning. For the S4 commercial product, most of the residue remained after cleaning.

Egg Release Test and Cleaning Test

A frying pan was sprayed with each of the four pan spray formulations of this Example 20. Testing was carried out as in Example 15. Spraying continued for 7 seconds or for 4 pumps of trigger spray, which covered the surface of the pan. The egg was permitted to cook for about 2 minutes on the first side. The pan was gently swirled to check if the egg stuck in place. Where possible, the egg was slid out of the pan. Where the egg would not slide out, a spatula was used to remove the egg from the pan. When the egg slid out, a second egg was cooked.

The food release characteristics for each of the four samples were observed and recorded. All samples were found to perform well in the first egg releasing application, the degree of sticking being "1" for S1 and "0" for the other three. In each case, the egg slid out readily; with S1 a nudge with the spatula effected full release. During the second egg cook, S1 performed in the same manner as it did for the first egg. S2 also was recorded as a "1" degree of sticking, and slid out once moved by the spatula. Each of S3 and S4 experienced a "2" degree of sticking for the second egg, a spatula being required to lift and remove the egg.

Cleaning was carried out as in the Example 16 egg release test. Little residue remained for either S1 or S2, with S1 leaving some residue on sides of pan. For the S3 formulation, the pan was harder to clean than any of the structured lipid compositions, and much residue remained on the sides and bottom of the pan. For the S4 product, the pan was even harder to clean, with most of the residue remaining on the bottom and sides of the pan.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A pan release composition, comprising:
from about 60 to about 100 weight percent of an interesterified structured lipid, based upon the total weight of the composition, said structured lipid being an interesterification reaction product of a reactant charge, said reactant charge having between about 25 and about 75 weight percent, based upon the total weight of the charge, of a medium chain triglyceride having fatty acid chains from C6 to C12 in length, reacted with between about 75 and about 25 weight percent, based upon the total weight of the charge, of a long chain edible oil having fatty acid chains of at least C16 in length;

from 0 to about 30 weight percent of a modifier selected from the group consisting of a lecithin, a glyceride, and combinations thereof, based on the total weight of the composition; and said structured lipid has a Brookfield viscosity at 20° C. of between about 20 and about 52 centipoise and has a smoke point of at least about 195° C. (at least about 383° F.).

2. The pan release composition in accordance with claim 1, wherein said Brookfield viscosity at 20° C. is between about 30 and about 50 centipoise.

3. The pan release composition in accordance with claim 1, wherein said Brookfield viscosity at 20° C. is between about 35 and about 49 centipoise.

4. The pan release composition in accordance with claim 1, wherein said structured lipid has a smoke point of at least about 205° C. (greater than about 400° F.).

5. The pan release composition in accordance with claim 1, wherein said structured lipid has a smoke point of between about 196° C. and about 221° C. (between about 385° F. and about 430° F.).

6. The pan release composition in accordance with claim 1, wherein said structured lipid comprises at least about 85 percent by weight of the pan release composition, based upon the total weight of the composition, when propellant is not required.

7. The pan release composition in accordance with claim 1, wherein said structured lipid comprises between about 90 and about 98 percent by weight of the pan release composition, based upon the total weight of the composition, when propellant is not required.

8. The pan release composition in accordance with claim 1, wherein said structured lipid comprises between about 70 percent and about 97 percent by weight of the pan release composition, based upon the total weight of the composition.

9. The pan release composition in accordance with claim 1, wherein said medium chain triglyceride amount is between about 30 percent and about 60 percent by weight of the interesterification reactant charge, and the amount of the edible oil is between about 70 percent and about 40 percent by weight of the charge.

10. The pan release composition in accordance with claim 1, wherein said medium chain triglyceride amount is between about 35 percent and about 55 percent by weight of the interesterification charge, and the amount of the edible oil is between about 65 percent and about 45 percent by weight of the charge.

11. The pan release composition in accordance with claim 1, wherein said medium chain triglyceride is selected from the group consisting of caprylic triglyceride, capric triglyceride, and combinations thereof.

12. The pan release composition in accordance with claim 1, wherein said edible oil is selected from the group consisting of long chain triglycerides, soybean oil, corn oil, cottonseed oil, canola oil, olive oil, peanut oil, safflower oil, sunflower oil, oil from grain plants, palm oil, coconut oil, and combinations thereof.

13. A pan release composition, comprising:

from about 60 to about 100 weight percent of an interesterified structured lipid, based upon the total weight of the composition, said structured lipid being an interesterification reaction product of a reactant charge, said reactant charge having between about 25 and about 75 weight percent, based upon the total weight of the charge, of a medium chain triglyceride having fatty acid chains from C6 to C12 in length, reacted with between about 75 and about 25 weight percent, based upon the total weight of the charge, of a long chain edible oil having fatty acid chains of at least C16 in length;

from 0 to about 30 weight percent of a modifier selected from the group consisting of a lecithin, a glyceride, and combinations thereof, based on the total weight of the composition; and from about 10 to about 30 weight percent, based upon the total weight of the pan release composition, of a propellant for facilitating delivery by spraying of the pan release cooking composition, wherein said propellant comprises a paraffin series hydrocarbon.

14. The pan release composition in accordance with claim 13, wherein said propellant is selected from the group consisting of propane, isobutane, and combinations thereof.

15. A pan release composition, comprising:

from about 60 to about 100 weight percent of an interesterified structured lipid, based upon the total weight of the composition, said structured lipid being an interesterification reaction product of a reactant charge, said reactant charge having between about 25 and about 75 weight percent, based upon the total weight of the charge, of a medium chain triglyceride having fatty acid chains from C6 to C12 in length, reacted with between about 75 and about 25 weight percent, based upon the total weight of the charge, of a long chain edible oil having fatty acid chains of at least C16 in length;

a modifier which is a combination of between about 0.5 percent and about 10 percent by weight, based upon the total weight of the total weight of the pan release composition, of a lecithin component and a phosphated mono and diglyceride component; and from about 0 to about 30 weight percent, based upon the total weight of the composition, of a propellant for facilitating delivery by spraying of the pan release cooking composition.

16. The pan release composition in accordance with claim 15, wherein said lecithin component is a heat resistant lecithin.

17. The pan release composition in accordance with claim 15, wherein said propellant is selected from the group consisting of propane, isobutane, and combinations thereof.

18. A pan release composition, comprising:

from about 60 to about 100 weight percent of an interesterified structured lipid, based upon the total weight of the composition, said structured lipid being an interesterification reaction product of a reactant charge, said reactant charge having between about 25 and about 75 weight percent, based upon the total weight of the charge, of a medium chain triglyceride having fatty acid chains from C6 to C12 in length, reacted with between about 75 and about 25 weight percent, based upon the total weight of the charge, of a long chain edible oil having fatty acid chains of at least C16 in length;

optionally up to about 30 percent by weight of a modifier selected from the group consisting of a lecithin, a glyceride, and combinations thereof, based on the total weight of the composition;

said pan release cooking composition is characterized by color darkening and residue build-up during cooking which is at least comparable to, and cleanability after cooking which is easier when compared with, pan release compositions not including said structured lipid containing pan release composition; and up to about 20 percent by weight of a propellant, based upon the total weight of the composition, between about 0.5 and about 15 percent by weight of a lecithin modifier, based upon the total weight of the composition, and between about 0.5 and about 15 percent by weight of a glyceride modifier, based upon the total weight of the composition.

19. The pan release composition in accordance with claim 18, wherein said lecithin modifier is heat resistant lecithin.

20. A method for controlling residue build-up and color darkening on cooking surfaces, utensils and containers during cooking and for easing cleaning thereof after cooking, comprising:

providing a medium chain triglyceride having a carbon chain length of between C6 and C12;

providing an edible oil having a carbon chain length of between C16 and C22;

introducing a reactant charge to a reaction location, the reactant charge including between about 25 percent and about 75 percent by weight of the medium chain triglyceride and between about 75 percent and about 25 percent by weight of said edible oil, based upon the total weight of the reactant charge;

interesterifing said reactant charge into an interesterified structured lipid;

preparing a pan release cooking composition comprising said interesterified structured lipid;

applying said pan release cooking composition to a cooking surface utensil or container;

cooking a food product with the cooking surface, utensil or container to which the pan release composition has been applied, said cooking depositing low levels of residue and avoiding dark coloration; and cleaning said cooking surface, utensil or container for removing any residue from said cooking.

21. The method in accordance with claim 20, wherein said cooking is characterized by color darkening and residue build-up during cooking which is at least comparable to, and said cleaning is easier when compared with, pan release compositions not including said structured lipid containing pan release composition.

22. The method in accordance with claim 20, wherein said structured lipid has a smoke point of at least about 205° C. (greater than about 400° F.).

23. The method in accordance with claim 20, wherein said medium chain triglyceride amount is between about 30 percent and about 60 percent by weight of the interesterification reactant charge, and the amount of the edible oil is between about 70 percent and about 40 percent by weight of the charge.

24. The method in accordance with claim 20, wherein said medium chain triglyceride amount is between about 35 percent and about 55 percent by weight of the interesterification reactant charge, and the amount of the edible oil is between about 65 percent and about 45 percent by weight of the charge.

25. The method in accordance with claim 20, wherein said preparing includes adding between 0 and about 30 percent by weight of a propellant selected from the group consisting of propane, isobutane, and combinations thereof, based upon the total weight of the pan release composition.

26. The method in accordance with claim 20, wherein said medium chain triglyceride is selected from the group consisting of caprylic triglyceride, capric triglyceride, and combinations thereof, and wherein said edible oil is a domestic oil selected from the group consisting of soybean oil, corn oil, cottonseed oil, canola oil, olive oil, peanut oil, safflower oil, sunflower oil, oil from grain plants, and combinations thereof.

27. The method in accordance with claim 20, wherein said pan release composition has a Brookfield viscosity at 20° C. of between about 20 and about 52 centipoise.

28. The method in accordance with claim 20, wherein said pan release composition has a smoke point of at least about 195° C. (at least about 383° F.).

29. The method in accordance with claim 20, wherein said preparing comprises adding at least about 60 percent by weight of the structured lipid, based upon the total weight of the pan release composition.

30. The method in accordance with claim 29, wherein said preparing further includes adding up to about 15 percent by weight of a lecithin, based upon the total weight of the pan release composition.

31. The method in accordance with claim 29, wherein said preparing further includes adding up to about 15 percent by weight of glyceride, based upon the total weight of the pan release composition.

32. The method in accordance with 29, wherein said preparing further includes adding up to about 15 percent by weight of a heat resistant lecithin and up to about 15 percent by weight of a phosphated mono and diglyceride, both based upon the total weight of the pan release composition.

33. A method for using a medium chain triglyceride in a pan release cooking composition while avoiding high amounts and tenacity of residue build-up on cooking or baking containers and utensils, comprising:

providing a medium chain triglyceride having a carbon chain length of between C6 and C12;

providing an edible oil having a carbon chain length of between C16 and C22;

introducing a reactant charge to a reaction location, the reactant charge including between about 25 percent and about 75 percent by weight of the medium chain triglyceride and between about 75 percent and about 25 percent by weight of said edible oil, based upon the total weight of the reactant charge;

interesterifing said reactant charge into an interesterified structured lipid;

combining said interesterified structured lipid with at least one of a propellant, a lecithin and a glyceride to provide a pan release cooking composition;

spraying the pan release composition onto a cooking or baking container or utensil surface adapted to contact a food;

heating the cooking or baking container or utensil surface in contact with the food so as to cook or bake the food in the presence of the pan release cooking composition while avoiding high amounts of residue buildup; and allowing cooling of the cooking or baking container or utensil and cleaning same under mild cleaning conditions.

34. The method in accordance with claim 33, wherein said combining comprises adding at least about 60 percent by weight of the structured lipid, based upon the total weight of the pan release composition, adding between 0 and about 15 percent by weight of a lecithin, based upon the total weight of the pan release composition and adding between 0 and about 15 percent by weight of a glyceride, based upon the total weight of the pan release composition.

* * * * *

UNITED STATES PATENT AND TRADEMARK OFFICE
CERTIFICATE OF CORRECTION

| | | |
|---|---|---|
| PATENT NO. | : 7,247,334 B2 | Page 1 of 1 |
| APPLICATION NO. | : 10/706633 | |
| DATED | : July 24, 2007 | |
| INVENTOR(S) | : Pamela Lynn Teran et al. | |

It is certified that error appears in the above-identified patent and that said Letters Patent is hereby corrected as shown below:

Column 27, Claim 3, line 21: "about 35 and about 49 centipoise."

Should read: --about 35 and about 48 centipoise.--

Signed and Sealed this

Twenty-ninth Day of April, 2008

JON W. DUDAS
*Director of the United States Patent and Trademark Office*